Patented Feb. 23, 1932

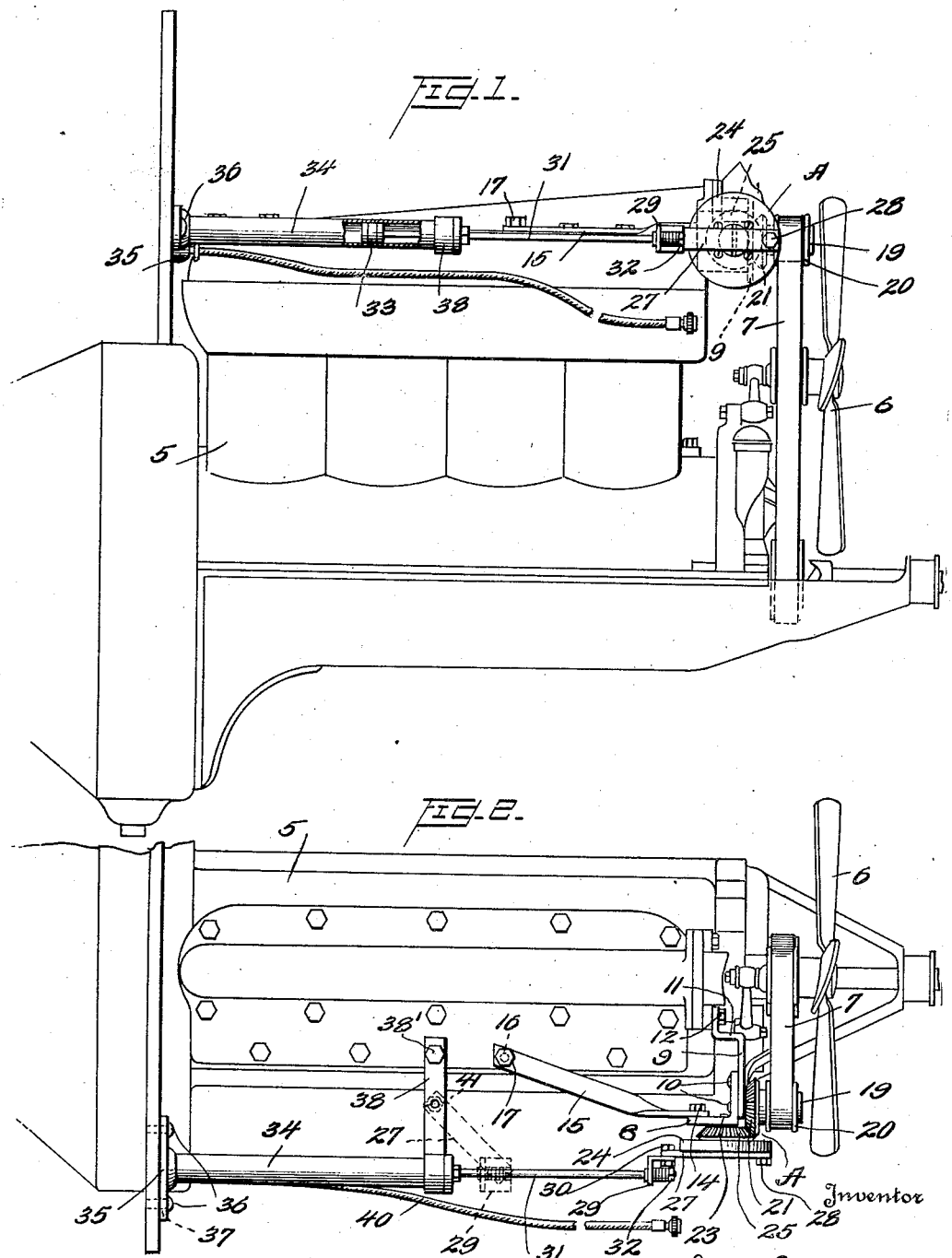

1,846,784

UNITED STATES PATENT OFFICE

LOUIS BOROCHOFF, OF ATLANTA, GEORGIA

AUTOMOBILE TIRE PUMP

Application filed January 26, 1928. Serial No. 249,671.

Generically this invention relates to air pumps, but is more especially directed to the type adapted to be carried by an automobile and operated by the engine thereof for effecting inflation of the tires of the car so equipped.

An important object of this invention is the provision of a pump structure of this character adapted to be mounted on and secured to an automobile engine, by the fastening elements or bolts normally employed in connection with the engine, thereby eliminating the necessity of additional materials and cost of labor incident to operatively mounting the device.

A further important object of this invention is the provision of a pump structure of this character adapted to be expeditiously mounted on the engine and operable by the fan belt of the motor.

Another object of this invention is the provision of a device of this character, simple in construction, manufacturable at a reasonable cost, and comprising a geared unit for transmitting power from the fan belt to the pump, and means for disconnecting the pump from said geared unit when not in use.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 1 is a side elevation of my improved device operatively positioned on the engine; and Fig. 2 is a top plan view of the device operatively positioned, and showing in dotted outlines the means for securing the pump disengaged from the driving unit.

The devices of this general character with which I am familiar have proven unsatisfactory by reason of their complexity of construction, cost of production, impracticability of being expeditiously mounted on the engine, and for other reasons, and it was to overcome such deficiencies and to provide a pump structure adapted to be mounted on an automobile engine by fastening elements already employed in connection therewith, without necessitating changes in the engine construction, and including a power transmitting unit connected to the fan belt for imparting reciprocatory motion to the pump, and means for effecting detachment of the pump when not in use, that I designed the device forming the subject matter of this invention.

In the illustrated embodiment characterizing this invention there is shown a portion of a motor 5 and associated structure, fan 6, and fan belt 7 of conventional construction.

A geared power transmitting unit A adapted to be mounted on the motor 5 as hereinafter more fully explained, comprises an angle plate 8, and a substantially L-shaped brace member 9 secured to the front face thereof by rivets or other suitable fastening elements 10 extending through said members as will be well understood.

The brace member 9, in the present instance, extends outwardly in a plane coincident with the upper surface of the angle plate 8 and is offset as at 11, its free end being perforated to receive the bolt 12 by means of which it is firmly secured to the motor. Secured to the opposite end of the angle plate 8 by a rivet or other suitable fastening means 14 is a brace member 15 twisted or otherwise formed, so that its free end will lie in a horizontal plane, and perforated as at 16 to receive, in the present instance, the cylinder head bolt 17 by means of which it is firmly secured to the motor. It will thus be seen that by means of braces 9 and 15 the angle plate is supported with its front face substantially coincident with the front of the motor and spaced from the side thereof.

A threaded opening 18 is formed in the front portion of the angle plate 8 adapted to receive the threaded bearing shaft 19 on which is rotatably mounted fan belt pulley 20. Also mounted on the shaft 19 is a bevel gear wheel 21, secured to the inner face of pulley 20 by screws or other suitable fastening elements, or it may be formed integral with said pulley if desired. The side portion of the angle plate 8 slightly spaced from the front portion is formed with a perforation adapted to receive one end of a bearing shaft 23 on which is adapted to be mounted a fly wheel 24.

To the inner face of fly wheel 24 is firmly secured a bevel gear 25 by screws or other suitable fastening elements 26, said gear adapted to mesh with bevel gear 21 for a purpose hereinafter more fully appearing.

A link 27 is adapted to have one end eccentrically and rotatably connected to fly wheel 24 by bearing set screw 28 and its opposite end secured loosely to the forward leg of an angle member or swivel joint 29 by a bolt or other suitable connecting means 30. The other or transverse leg of the angle member 29 is formed with an opening to receive the free end of piston rod 31 to which it is secured by the nuts or other suitable elements 32, the said piston rod being connected to piston 33 of pump 34. The said pump 34 is formed with a base plate 35 adapted to be secured to the automobile structure 5 by bolts 36 extending through perforations 37, so that the pump or pump cylinder 34 will be positioned in operating alignment with the fly wheel 24, as will be well understood. In order to further support the pump 34, a brace member 38 is adapted to have one end suitably secured around the pump cylinder adjacent its free end, and its opposite end secured to the motor 5 by cylinder head bolt 38' adapted to extend through perforation 39. An air hose 40 is adapted to have one end operatively connected to the pump cylinder or barrel 34 and its other end detachably connected to the tire to be inflated, storage tank or the like (not shown).

From the above description it is apparent that when the device has been operatively mounted on the motor, it is adapted to be driven by the fan belt 7, pulley 20, mitering gears 21 and 25, fly wheel 24, link 27, piston rod 31, effecting reciprocation of piston 33 in pump 34, and when so actuated air will be forced through hose pipe 40 to the tire to be inflated, as will be understood without further explanation.

When it is desired to disconnect the pump from the driving unit A it is only necessary to disconnect the link 27 from pin 28 and secure said link to the brace 38 as at 41, the pumping unit therefore being inoperative except when in use, while the driving unit A is in operation whenever the motor is in operation.

With further reference to gears 21 and 25, it should be noted that while these gears may be formed from any suitable material, they are preferably constructed from a fiber composition so as to be noiseless in operation.

From the above description it is apparent that I have designed a device adapted to be mounted on and driven by the engine of a motor car for effecting inflation of the tires of the car so equipped whenever desired, simple in construction, capable of long continued use without requiring replacement of parts, easily installed, manufacturable at a negligible cost, and efficient for the purposes intended.

Although in practice I have found that the form of my invention illustrated in the accompanying drawings and referred to in the above description as the preferred embodiment, is the most efficient and practical; yet realizing the conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. A power transmitting device adapted to be mounted on a motor, the latter including a fan belt, said device comprising a fly wheel supported by the motor; a driving connection between the fly wheel and fan belt, a working unit mounted on the motor, a reciprocating element having one end connected to the working unit, the other to the fly wheel and means in connection with the reciprocating element for securing the latter in inoperative position.

2. A power transmitting unit adapted to be mounted on a motor, the latter including a fan belt, said unit comprising an angle plate, a bracket having one end secured to one leg of said plate and the other end adapted to be attached to the motor by one of said motor bolts, a bracket having one end secured by a cylinder-head bolt, a pulley mounted on one leg of said angle plate, a driving connection between the pulley and the fan belt, a fly wheel supported on the other leg of said angle plate, mitering gears secured to the inner faces of the pulley and fly wheel respectively, a working unit operatively secured to the motor, a reciprocating element, an angle member having one leg adapted to be loosely connected to the working unit, the other similarly connected to the reciprocating element, said reciprocating element being detachably connected to the fly wheel and means for securing said reciprocating element in inoperative position.

LOUIS BOROCHOFF.